(12) United States Patent
Arrabolu et al.

(10) Patent No.: US 11,863,395 B2
(45) Date of Patent: ***Jan. 2, 2024

(54) TECHNIQUES FOR CORRELATING SERVICE EVENTS IN COMPUTER NETWORK DIAGNOSTICS

(71) Applicant: Microsoft Technology Licensing, LLC, Redmond, WA (US)

(72) Inventors: Sai Sankalp Arrabolu, Kirkland, WA (US); Anastasiia Pronska, Kirkland, WA (US); Thomas William Potthast, III, Sammamish, WA (US); Roman Batoukov, Sammamish, WA (US); John Anthony Morman, Bellevue, WA (US); Suren Aghajanyan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/662,931

(22) Filed: May 11, 2022

(65) Prior Publication Data

US 2022/0407779 A1    Dec. 22, 2022

Related U.S. Application Data

(63) Continuation of application No. 16/567,824, filed on Sep. 11, 2019, now Pat. No. 11,362,902.

(Continued)

(51) Int. Cl.
*G06F 15/173* (2006.01)
*H04L 41/12* (2022.01)
(Continued)

(52) U.S. Cl.
CPC .......... *H04L 41/12* (2013.01); *H04L 41/0803* (2013.01); *H04L 41/22* (2013.01);
(Continued)

(58) Field of Classification Search
CPC ..... H04L 41/12; H04L 41/0803; H04L 41/22; H04L 43/0876; H04L 63/1425;
(Continued)

(56) References Cited

U.S. PATENT DOCUMENTS 11,288,319 B1    3/2022    Das et al.
2019/0034530 A1    1/2019    Linn et al.
(Continued)

OTHER PUBLICATIONS

"Final Office Action Issued in U.S. Appl. No. 16/677,370", dated May 11, 2022, 13 Pages.

(Continued)

*Primary Examiner* — John B Walsh

(57) ABSTRACT

Examples described herein generally relate to receiving a query context for service events occurring on one or more networks, determining, based on the query context, a set of service events occurring on the one or more networks, querying multiple layers of a multiple-layer relational graph to determine one or more other service events having a defined relationship with the set of service events at one or more of the multiple layers, where the multiple layers include a configuration layer, an observation layer, and learned layer, defining relationships between services or service events, and indicating, via a user interface and in response to the query context, the one or more other service events.

20 Claims, 7 Drawing Sheets

Related U.S. Application Data

(60) Provisional application No. 62/850,300, filed on May 20, 2019.

(51) Int. Cl.
| | |
|---|---|
| *H04L 41/0803* | (2022.01) |
| *H04L 41/22* | (2022.01) |
| *H04L 43/0876* | (2022.01) |
| *H04L 9/40* | (2022.01) |
| *H04L 67/51* | (2022.01) |
| *H04L 67/50* | (2022.01) |

(52) U.S. Cl.
CPC ...... *H04L 43/0876* (2013.01); *H04L 63/1425* (2013.01); *H04L 67/51* (2022.05); *H04L 67/535* (2022.05)

(58) Field of Classification Search
CPC ..... H04L 67/51; H04L 67/535; H04L 41/085; H04L 41/16; H04L 43/08; H04L 41/0677; H04L 41/065; H04L 41/0604
See application file for complete search history.

(56) References Cited

U.S. PATENT DOCUMENTS

| | | |
|---|---|---|
| 2019/0099653 A1 | 4/2019 | Wanke et al. |
| 2019/0149396 A1* | 5/2019 | Zafer .................. H04L 41/0654 709/224 |
| 2019/0251487 A1 | 8/2019 | Srivastava |

OTHER PUBLICATIONS

"Non Final Office Action Issued in U.S. Appl. No. 16/677,370", dated Nov. 3, 2022, 13 Pages.

"Notice of Allowance Issued in U.S. Appl. No. 16/677,370", dated May 10, 2023, 9 Pages.

* cited by examiner

TECHNIQUES FOR CORRELATING SERVICE EVENTS IN COMPUTER NETWORK DIAGNOSTICS

CLAIM OF PRIORITY UNDER 35 U.S.C. § 119

The present Application is a continuation of U.S. patent application Ser. No. 16/567,824, filed Sep. 11, 2019, which claims priority to Provisional Application No. 62/850,300, entitled "TECHNIQUES FOR CORRELATING SERVICE EVENTS IN COMPUTER NETWORK DIAGNOSTICS" filed May 20, 2019, and which applications are herein incorporated herein by reference in their entireties.

BACKGROUND

Large-scale networked systems are provided as platforms employed in a variety of settings for running service applications and maintaining data for business and operational functions. Such networks can include and/or be a part of a data center (e.g., a physical cloud computing infrastructure) that may provide a variety of services (e.g., web applications, email services, search engine services, resource sharing services, etc.) for client computing devices connected to at least a portion of the network. These large-scale networked systems typically include a large number of resources distributed throughout the data center, where each resource can include or at least resemble a physical machine.

In the realm of telemetry for monitoring health of network resources, a vast number (e.g., billions) of metrics are collected from or for resources over a period of time (e.g., each second) of a given network. Due to the number of metrics, it can become difficult to keep track of the metrics and/or related signals, health status of the network resources, etc. In addition, when services experience issues, engineers that maintain the services and/or corresponding resources may be notified by system alarms tens or hundreds of times, and the engineers do not always know which alarm is the most important to respond to, or may miss important alarms due to the sheer number of alarms, etc. Issues can also be caused by downstream dependencies, and without the necessary domain knowledge, it can be difficult to understand what signals are affecting a given service, and/or how to locate/determine a dependency that may ultimately be causing the issue.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

In an example, a computer-implemented method for detecting related service events in a network diagnostic application is provided. The method includes receiving a query context for service events occurring on one or more networks, determining, based on the query context, a set of service events occurring on the one or more networks, querying multiple layers of a multiple-layer relational graph to determine one or more other service events having a defined relationship with the set of service events at one or more of the multiple layers, where the multiple layers include a configuration layer defining configured relationships between services or service events, an observation layer defining observed relationships between services or service events, and learned layer defining algorithmically-determined relationships between services or service events, and indicating, via a user interface and in response to the query context, the one or more other service events.

In another example, a computing device for detecting related service events in a network diagnostic application is provided that includes a memory storing one or more parameters or instructions for identifying related service events from a service event repository, and at least one processor coupled to the memory. The at least one processor is configured to receive a query context for service events occurring on one or more networks, determine, based on the query context, a set of service events occurring on the one or more networks, query multiple layers of a multiple-layer relational graph to determine one or more other service events having a defined relationship with the set of service events at one or more of the multiple layers, where the multiple layers include a configuration layer defining configured relationships between services or service events, an observation layer defining observed relationships between services or service events, and learned layer defining algorithmically-determined relationships between services or service events, and indicate, via a user interface and in response to the query context, the one or more other service events.

In another example, a non-transitory computer-readable medium including code executable by one or more processors for detecting related service events in a network diagnostic application is provided. The code includes code for receiving a query context for service events occurring on one or more networks, determining, based on the query context, a set of service events occurring on the one or more networks, querying multiple layers of a multiple-layer relational graph to determine one or more other service events having a defined relationship with the set of service events at one or more of the multiple layers, where the multiple layers include a configuration layer defining configured relationships between services or service events, an observation layer defining observed relationships between services or service events, and learned layer defining algorithmically-determined relationships between services or service events, and indicating, via a user interface and in response to the query context, the one or more other service events.

To the accomplishment of the foregoing and related ends, the one or more examples comprise the features hereinafter fully described and particularly pointed out in the claims. The following description and the annexed drawings set forth in detail certain illustrative features of the one or more examples. These features are indicative, however, of but a few of the various ways in which the principles of various examples may be employed, and this description is intended to include all such examples and their equivalents.

DETAILED DESCRIPTION

Figure 1:
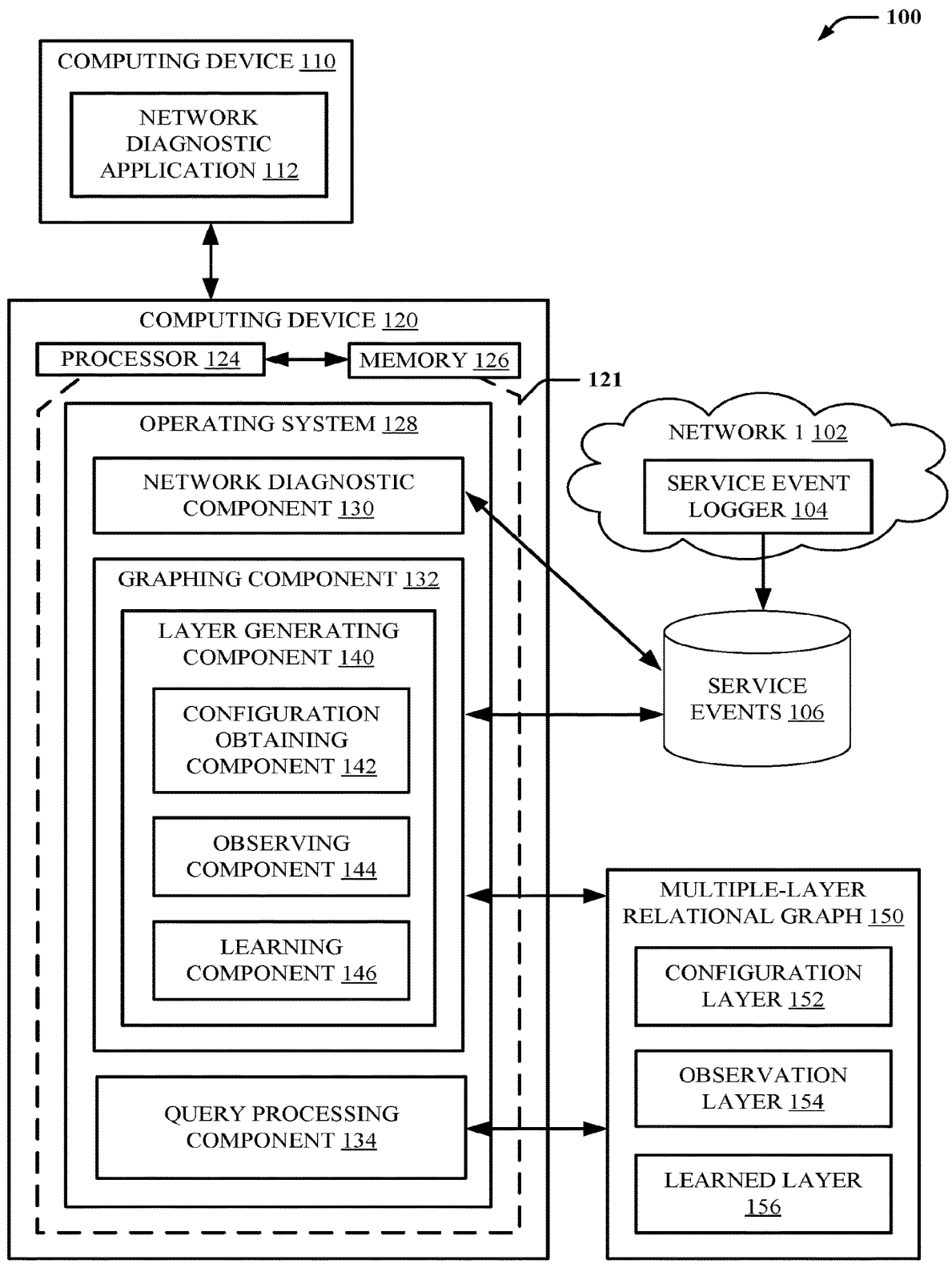
FIG. 1 is a schematic diagram of an example of a computing device for determining relationships among service events in accordance with examples described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various examples related to correlating service events, or underlying incident records, to facilitate determining, for a given service event, one or more correlated service events. This can facilitate improved service event analysis, root cause prediction, alert noise reduction, and/or the like. For instance, a multiple-layer relational graph can be generated and employed to define relationships among service events, and the graph can be queried to determine, for a given service or service event, the correlations and/or corresponding patterns at one or more of the layers to determine a set of related services or service events. For example, the multiple-layer relational graph can include a configuration layer that defines relationships between services and/or between service events based on a stored configuration. In addition, for example, the multiple-layer relational graph can include an observation layer that defines relationships between services and/or between service events based on observed network activity and/or usage of a network diagnostic system. Moreover, for example, the multiple-layer relational graph can include a learned layer that defines relationships between services and/or between service events based on algorithmic determinations about the services and/or service events (e.g., around parameters thereof).

In an example, given a query context of a service and/or service event, the multiple-layer relational graph can be queried to determine the correlated services and/or service events, patterns of correlations between the services and/or service events, etc. at each layer to determine other services and/or service events that are possibly of interest (e.g., that have some correlation). In one example, the correlations or related metrics can be weighted at each layer based on the layer itself (e.g., to assign different weights in general to configured, observed, learned, etc. correlations) and/or based on other parameters regarding the correlation. Where the correlation or related metric achieves a threshold, in one example, the corresponding service and/or service event may be indicated for the query context to identify possibly related services and/or service events. This can assist in reducing the number of services and/or service events to be observed in diagnosing the service or service event that is the subject of the query context.

Figure 2:
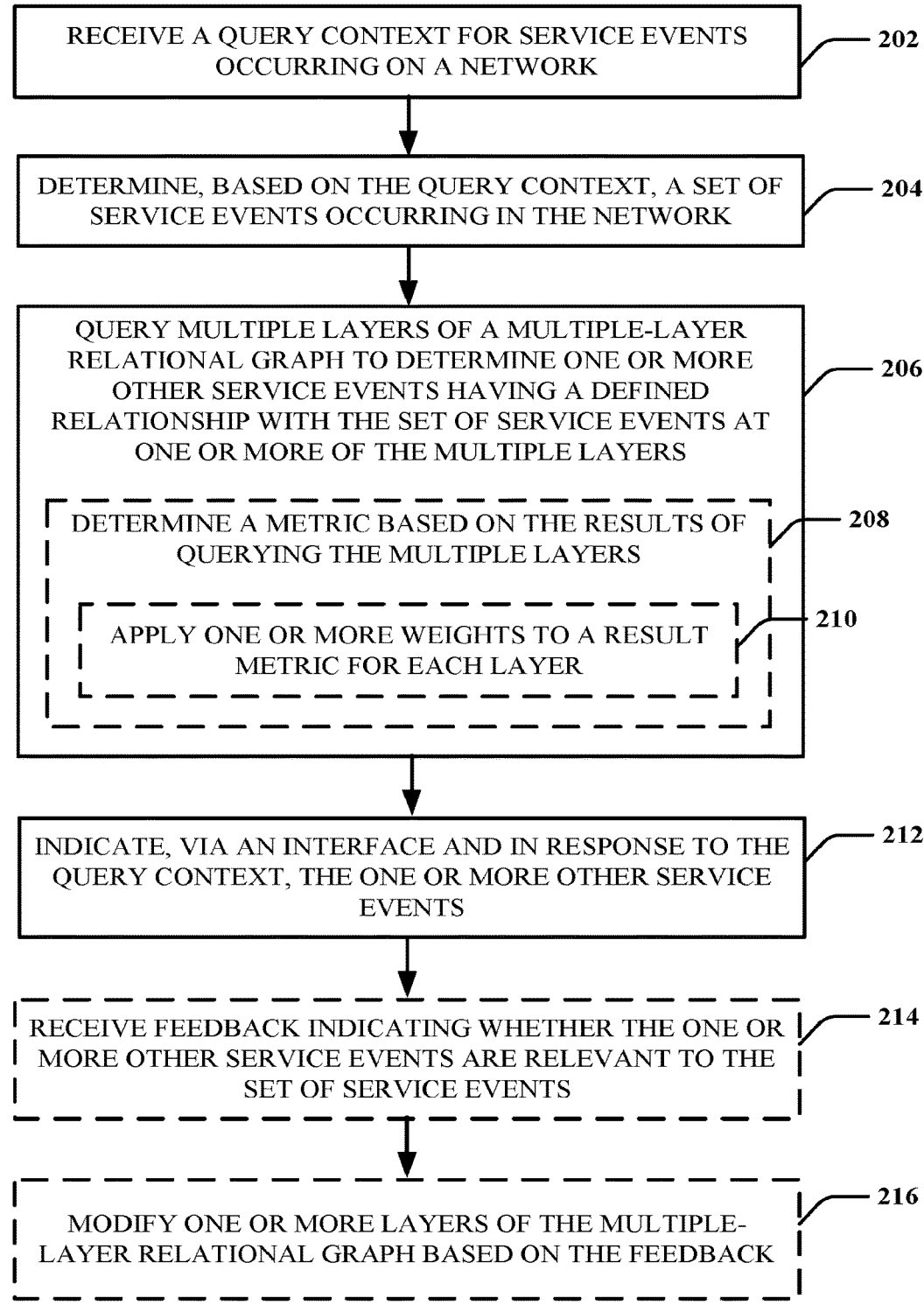
FIG. 2 is a flow diagram of an example of determining relationships among service events in accordance with examples described herein.
Figure 3:
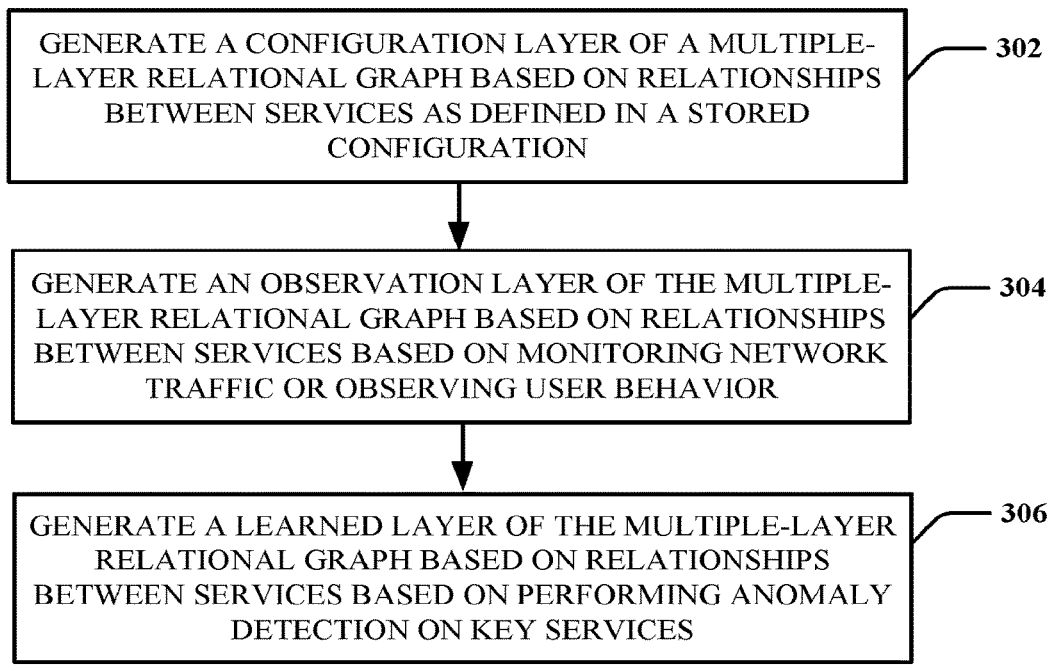
FIG. 3 is a flow diagram of an example of generating a multiple-level relational graph of service events in accordance with examples described herein.

Turning now to FIGS. 1-7, examples are depicted with reference to one or more components and one or more methods that may perform the actions or operations described herein, where components and/or actions/operations in dashed line may be optional. Although the operations described below in FIGS. 2-3 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a wireless communication system 100 that includes one or more networks, such as network 1 102, having one or more service event loggers 104 for logging service events occurring on resources of the network 1 102. For example, the resources of the network 1 102 may include various types of nodes, such as computing devices, databases, devices with a network-specific functionality, such as routers, bridges, firewalls, web servers, load balancers, etc., and/or the like. Each resource may have an associated service event logger 104 to log service events in a service event repository 106, where the service event logger 104 may operate on the resource or otherwise to detect communications from the resource for logging the service events. In an example, the service events in service event repository 106 may include various types of events to notify of a health or status of one or more resources, such as processor or memory utilization on the resource, throughput of traffic on the resource, application-specific events that are definable by applications executing on the resource, etc. The service events may also include or be referred to as incident reports to identify certain incidents occurring on resources. In one example, an incident report can include an incident derived from multiple service events detected with one or more defined parameter values (e.g., a poor or non-existent connection for a network resource based on detecting one or more consecutive service events related to a dropped connection).

A computing device 110 can be provided that can execute a network diagnostic application 112 to obtain service events from the service event repository 106 for inspection thereof and/or taking remedial steps to resolve an identified incident. As described, this can result in a vast number of service events being generated and stored in the service event repository 106 over a short period of time, and as such monitoring each service event can become overwhelming and ineffective for diagnosing possible issues in the network.

For example, another computing device 120 is provided for exposing a framework to obtain service event information from service event repository 106 and for generating additional structures to assist in processing the vast number of service events in the service event repository in accordance with aspects described herein. For example, computing device 120 can include or can otherwise be coupled with a processor 124 and/or memory 126, where the processor 124 and/or memory 126 can be configured to execute or store instructions or other parameters related to processing service events, generating a multiple-layer relational graph defining relationships among the service events, responding to queries for service events, etc., as described herein. For example, processor 124 and memory 126 may be separate components communicatively coupled by a bus (e.g., on a motherboard or other portion of a computing device, on an integrated circuit, such as a system on a chip (SoC), etc.), components integrated within one another (e.g., processor 124 can include the memory 126 as an on-board component 121), and/or the like. Memory 126 may store instructions, parameters, data structures, etc., for use/execution by processor 124 to perform functions described herein.

In an example, computing device 120 can execute an operating system 128 (e.g., via processor 124 and/or memory 126) for providing an environment for executing one or more components or applications, such as a network diagnostic component 130 for fulfilling requests for service event data from the service event repository 106, as requested by network diagnostic application(s) 112 on one or more other computing devices 110, a graphing component 132 for generating a multiple-layer relational graph 150 defining multiple layers of relationships between service events in the service event repository 106, and/or a query processing component 134 for processing a query context for a service event based on determining one or more related service events from the multiple-layer relational graph 150.

In an example, graphing component 132 may include a layer generating component 140 for generating the multiple layers of the multiple-layer relational graph 150. For example, layer generating component 140 can include a configuration obtaining component 142 for obtaining a configuration (e.g., as stored in memory 126 or other memory or from another device related to the network, another device for configuring network diagnostic analysis, etc.) where the configuration can specify relationships between service events or corresponding services, and generating the configuration layer 152 of the multiple-layer relational graph 150 to indicate relationships based on the obtained configuration. In another example, layer generating component 140 can include an observing component 144 for observing network traffic, user behavior of the network diagnostic application 112, etc. with respect to the service events and/or corresponding services, and generating the observation layer 154 of the multiple-layer relational graph 150 to indicate relationships based on the observations. In another example, layer generating component 140 can include a learning component 146 for performing anomaly detection of key services or service events in the service event repository 106, and generating the learned layer 156 of the multiple-layer relational graph 150 to indicate relationships based on the detected anomalies in the service events.

In one example, query processing component 134 can process query contexts for service events received by or from the network diagnostic component 130 to provide additional service events that may be of interest based on a set of service events or services in the query context. For example, query processing component 134 can query graphing component 132 to determine the one or more additional service events based on relationships specified in the multiple-layer relational graph 150. The relationships can be identified at each of (or one or more of) the different layers 152, 154, 156. Query processing component 134 can determine whether to include the additional service events based on which layer(s) indicate the relationship and/or different associated metrics, such as an observation count in the observation layer 154, a confidence metric of the relationship in the learned layer 156, etc.

Computing device 110 can also similarly include a processor 124, memory 126, operating system 128, etc., for operating the network diagnostic application 112 and/or other features or functions described herein. These components are not shown in the computing device 110 in FIG. 1 for ease of explanation.

FIG. 2 is a flowchart of an example of a method 200 for determining related service events in processing a query for a set of one or more service events. For example, method 200 can be performed by the computing device 120, and is accordingly described with reference to FIG. 1, as a non-limiting example of an environment for carrying out method 200.

In method 200, at action 202, a query context for service events occurring on a network can be received. In an example, query processing component 134, e.g., in conjunction with processor 124, memory 126, operating system 128, etc., can receive the query context for service events occurring on the network. For example, query processing component 134 can receive the query context from network diagnostic component 130, where the network diagnostic component 130 can receive a corresponding query from a network diagnostic application 112 executing on another computing device 110. For example, network diagnostic component 130 can facilitate querying of service events in service event repository 106, as described, and can provide various network diagnostic applications 112 with service event information (e.g., incident reports, etc.) based on a request from a network diagnostic application 112, based on a subscription from the network diagnostic application 112 to receive certain service events (e.g., for certain resources and/or for certain types of service events, etc.), and/or the like.

Figure 4:
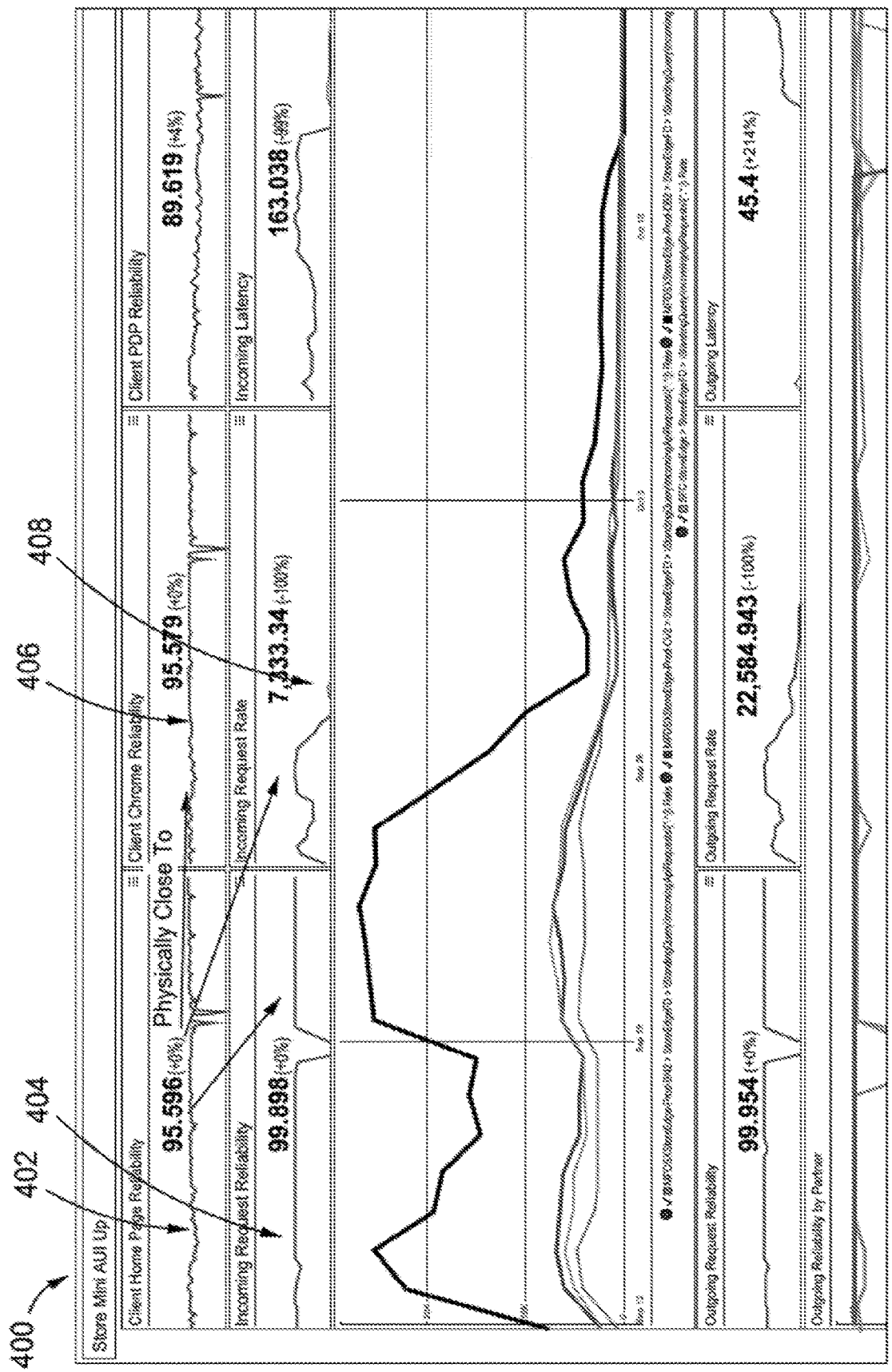
FIG. 4 is a diagram of an example of a user interface of a network diagnostic application in accordance with examples described herein.
Figure 5:
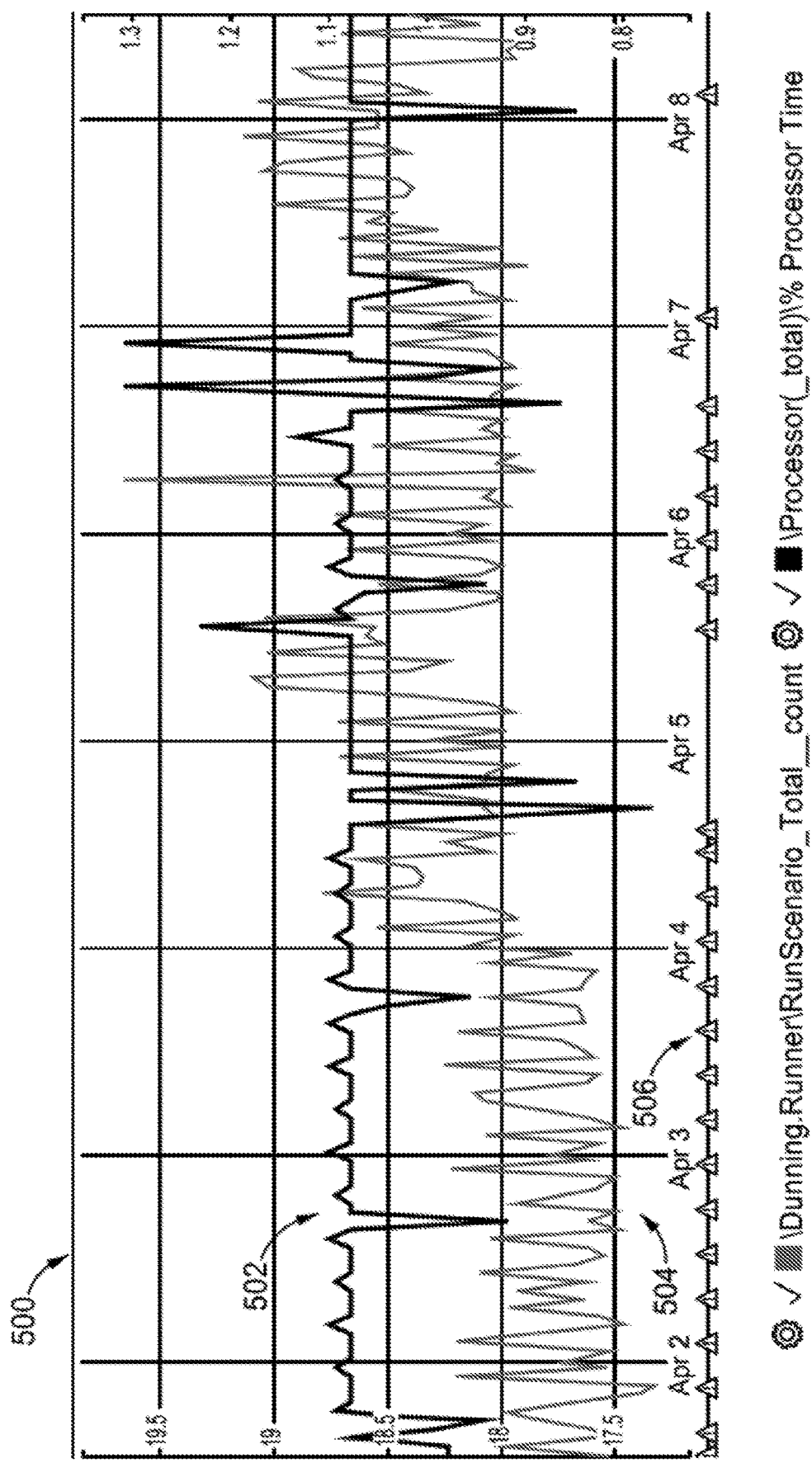
FIG. 5 is a graphical representation of an example of signals corresponding to underling service events in accordance with examples described herein.

In one specific example, a query context can relate to a signal that can represent service events, such as a signal line representing processor utilization at a network resource. In this example, network diagnostic application 112 may request service events related to the processor utilization at the network resource, which may include periodic service events received from the network resource (e.g., via a service event logger 104) that report the processor utilization. Network diagnostic application 112 can utilize the service events to generate a signal on a user interface representing the processor utilization reported in the service events. Examples are shown in FIGS. 4 and 5, which are described in further detail below.

In one example, network diagnostic component 130 can also implement security policies that define security contexts for users to access certain service events for certain nodes, certain types of service events, etc. In this example, network diagnostic component 130 can ensure a network diagnostic application 112 has the security clearance (e.g., a user of the application 112 is in a certain security group) to receive the requested service event information. In any case, network diagnostic component 130 can provide requested service event information to the corresponding network diagnostic application 112.

In method 200, at action 204, a set of service events occurring in the network can be determined based on the query context. In an example, query processing component 134, e.g., in conjunction with processor 124, memory 126, operating system 128, etc., can determine, based on the query context, the set of (e.g., one or more) service events occurring in the network. For example, the request can be a request/response request, a subscription request, etc., that can indicate one or more parameters in the query context. The one or more parameters may identify a type of service event, a service, a corresponding network resource, and/or the like. In one example, the query content may indicate a user account for the network diagnostic application 112, a network resource or machine being viewed, and/or a view (or related parameters) of service events for the network resource. Given this information, for example, network diagnostic component 130 can obtain data (e.g., including a collection of one or more service events) from service event repository 106 for providing to the corresponding network diagnostic application 112.

For example, network diagnostic component 130 can query the service event repository 106 to obtain the service events as requested (e.g., as related to a certain service and/or network resource). In another example, network diagnostic component 130 can receive (e.g., based on a subscription) service events from the service event repository 106 that correspond to the certain service and/or network resource (e.g., where the service event repository can callback a callback function of the network diagnostic component 130 based on receiving the service events and associating the service events with a subscription, etc.).

In addition, e.g., based on the query context, network diagnostic component 130 can additionally query a multiple-layer relational graph 150 for additional service events that may be related to the query context or the set of service events specified in the query context. Query processing component 134 can obtain the query and can determine the set of service events occurring in the network based on the query context (e.g., similarly as network diagnostic component 130 and/or can receive this information directly from network diagnostic component 130). Given the set of one or more service events in the query context, additional services possibly of interest can be identified from the multiple-layer relational graph, as described herein.

In one example, a query context can relate to a view of the network diagnostic application 112 that may be associated with multiple service events over a period of time, such as a signal showing resource usage over a period of time, where the resource usage is indicated over time in various service events. In this example, network diagnostic component 130 can query the service event repository to determine the service events indicating the resource usage for the service over the period of time, and network diagnostic application 112 can graphically represent the usage as a signal line over time. Network diagnostic application 112 can be used to generate multiple views in this regard, where each view can have an underlying query context for obtaining corresponding service events used to create the views. Thus, as an example of correlating service events based on observation, where views are generated for viewing together, a relationship between the underlying queries may be observed as occurring at similar times, for similar users, on similar network diagnostic application 112 or computing device 110, etc., as described further herein.

In method 200, at action 206, multiple-layers of a multiple-layer relational graph can be queried to determine one or more other service events having a defined relationship with the set of service events at one or more of the multiple layers. In an example, query processing component 134, e.g., in conjunction with processor 124, memory 126, operating system 128, etc., can query the multiple layers of the multiple-layer relational graph 150 to determine the one or more other service events having a defined relationship with the set of service events at one or more of the multiple layers. For example, query processing component 134 can query the configuration layer 152, the observation layer 154, and/or the learned layer 156 of the multiple-layer relational graph 150 to determine a relationship between the set of services and the one or more other services at least at one or more of the layers 152, 154, 156. The related service events may be determined as related based on a relation between the underlying services, which can be determined from one or more of the layers 152, 154, 156, and/or other considerations, such as based on a timing of the service events (e.g., service events occurring within a threshold time of one another) of the related services, and/or the like. Though shown as part of the same computing device 120, in an example, query processing component 134 can be at a different computing device than graphing component 132 that generates, manages, and/or stores the multiple-layer relational graph 150.

For example, given a service event in the set of one or more service events, query processing component 134 may identify a relationship with one or more other service events in the configuration layer 152, the observation layer 154, and/or the learned layer 156. As described, the configuration layer 152 can indicate (e.g., and/or may store an indication of) a relationship between the service event and one or more other service events as specified in a configuration. For example, the configuration may be generated using a user interface to allow a user to indicate known relationships between service events and/or corresponding services or by another mechanism.

The observation layer 154 can indicate (e.g., and/or may store an indication of) a relationship between the service event and one or more other service events that is based on observing network traffic of requests for the service event (or for a similar type of service event, for other events for the corresponding service, etc.) and similar network traffic (e.g., occurring at a similar time, from a similar computing device 110 or user account, etc.) of the one or more other service events.

The observation layer 154 can additionally or alternatively indicate (e.g., and/or may store an indication of) a relationship between the service event and one or more other service events that is based on observing user activity (e.g., of the network diagnostic application 112) in requesting and/or viewing the service event (or similar types of service events, other events for the corresponding service, etc.) and then also requesting and/or viewing the one or more other service events. For each observed relationship, the observation layer 154 may include one or more metrics, in one example, such as an observation count for the number of times the observed relationship criteria is detected. For example, the observations can be made in real-time or near real-time as traffic or user activity occurs, or can be made after-the-fact based on analyzing network traffic logs, logs of user activity on network diagnostic component 130, etc.

The learned layer 156 can indicate (e.g., and/or may store an indication of) a relationship between the service event and one or more other service events that is based on algorithmic determinations regarding the service events within the service event repository 106, such as by detecting data anomalies corresponding to the other service events based on keying the service event. For each anomaly, the learned layer 156 may include one or more metrics, in one example, such as a confidence metric for the determined relationship.

In querying the multiple layers at action 206, optionally at action 208, a metric based on the results of querying the multiple layers can be determined. In an example, query processing component 134, e.g., in conjunction with processor 124, memory 126, operating system 128, etc., can determine the metric based on the results of querying the multiple layers. For example, query processing component 134 can determine the metric based on whether a relationship is determined from a given layer and/or based on the layers within which the relationship exists. For example, query processing component 134 can determine a first metric where the relationship is determined from the configuration layer 152. In one example, this can be a highest metric and/or can definitively identify a relationship between the service in the set of one or more services and the other services, as the relationship can be explicitly identified by a user. In addition, for example, the metric can be determined based on one or more other metrics observed or obtained from each layer, such as an observation count in the observation layer for an observed relationship between the service events (and/or types of service events), confidence score in the learned layer, etc., as described.

Moreover, in determining the metric at action 208, optionally at action 210, one or more weights can be applied to a result metric for each layer. In an example, query processing component 134, e.g., in conjunction with processor 124, memory 126, operating system 128, etc., can apply the one or more weights to the result metric for each layer (or one or more of the layers). For example, query processing component 134 can apply higher weights to metrics for the configuration layer 152, as described, and/or can determine any desirable weighting for each layer. In one example, weighting the metrics for the layers 152, 154, 156 may be based on feedback of whether correlations between service events is accurate (e.g., based on being presented via an interface). In any case, the weights and/or metrics can be compared with threshold(s) to determine whether to indicate a correlation between a determined set of service events and the other service events discovered from the multiple-layer relational graph.

In addition, in an example, query processing component 134 can further perform pattern mining or other machine-learning algorithms based on a more limited set of correlated services and/or service events determined from the multiple-layer relational graph 150. In this example, query processing component 134 can further distill a list of services and/or service events determined as possibly related (e.g., such to indicate the other service events in reporting the determined service events) from the multiple layers 152, 154, 156 of the graph 150 by performing pattern mining on the list of services and/or service events.

In method 200, at action 212, the one or more other service events can be indicated via an interface and in response to the query context. In an example, query processing component 134 and/or network diagnostic component 130, e.g., in conjunction with processor 124, memory 126, operating system 128, etc., can indicate, via the interface (e.g., user interface) and in response to the query context, the one or more other service events. For example, query processing component 134 can indicate the one or more other service events to the network diagnostic component 130 for providing to the corresponding network service application 112 requesting the query. In an example, query processing component 134 can determine whether to indicate the one or more other service events based on the determined metric and/or can indicate any other service events for which a relationship is identified (or determined to have an associated metric that achieves a threshold) in one of the multiple layers of the multiple-layer relational graph 150, in a threshold number of the multiple layers of the multiple-layer relational graph 150, in each of the multiple layers of the multiple-layer relational graph 150, etc.

Additionally, for example, query processing component 134 and/or network diagnostic component 130 may indicate the one or more other service events including an indication of a relationship to the set of service events determined for the query context. The indication of relationship may include an identifier for the other service event(s) indicating the relationship and/or a level of relationship (e.g., a metric, weight, and/or the like, as described).

For example, network service application 112 can provide an indication of the one or more other service events received from the query processing component 134 or network diagnostic component 130 using various mechanisms. For example, network service application 112 can provide the indication as another view or signal line representing the one or more other service events presented along with a view that may correlate to the query context. In another example, network service application 112 can provide the indication as a list of the other service events, an indication of the other service events occurring at times corresponding to the set of service events that correlate to the query context, etc. In yet another example, network service application 112 can provide the indication as a pop-up or other notification that there are possibly related service events (e.g., the other service events) to the service events that are the subject of the query context. Moreover, as described, the network service application 112 may also provide a mechanism for indicating feedback for the indication of the other service events (e.g., feedback as to whether the other service events are relevant to the service events that are the subject of the query context).

In method 200, optionally at action 214, feedback indicating whether the one or more other service events are relevant to the set of service events can be received. In an example, query processing component 134 and/or network diagnostic component 130, e.g., in conjunction with processor 124, memory 126, operating system 128, etc., can receive the feedback indicating whether the one or more other service events are relevant to the set of service events. For example, as described, network service application 112 can provide an interface for prompting for feedback of the relevancy, and can provide any indicated feedback to the query processing component 134 and/or network diagnostic component 130. For example, the feedback can indicate whether the one or more other service events are relevant to the set of service events that are the subject of the query context, a level of relevancy, and/or the like.

In method 200, optionally at action 216, one or more layers of the multiple-layer relational graph can be modified based on the feedback. In an example, graphing component 132, e.g., in conjunction with processor 124, memory 126, operating system 128, etc., can modify one or more layers of the multiple-layer relational graph 150 (e.g., the configuration layer 152, the observation layer 154, or other layers) based on the feedback. For example, graphing component 132 may modify metrics associated with observations at the observation layer 154 based on the feedback (e.g., improve a metric where the feedback is positive, decrease the metric or delete an observation association where the feedback is negative, etc.).

FIG. 3 is a flowchart of an example of a method 300 for generating a multiple-layer relational graph indicating relationships between service events and/or corresponding services. For example, method 300 can be performed by the computing device 120, and is accordingly described with reference to FIG. 1, as a non-limiting example of an environment for carrying out method 300. In addition, method 300 can be performed in preparation for fulfilling queries and/or determining related service events, as described in method 200. In another example, method 300 can be performed as a real-time or near real-time process as part of querying the multiple-layer relational graph at action 206 of method 200.

In method 300, at action 302, a configuration layer of a multiple-layer relational graph can be generated based on relationships between services as defined in a stored configuration. In an example, layer generating component 140, e.g., in conjunction with processor 124, memory 126, operating system 128, graphing component 132, etc., can generate the configuration layer of the multiple-layer relational graph based on relationships between services as defined in the stored configuration. For example, configuration obtaining component 142 can obtain the stored configuration (e.g., from memory 126 and/or from another computing device, etc.), which can be generated based on user input received via an interface for defining relationships between service events and/or between corresponding services. As described, services may depend on one another, and this dependency can be indicated in the stored configuration. This can allow for determining a relationship between service events occurring on the dependent services (e.g., at a similar time or otherwise).

In one example, the configuration can define a relationship between service events based on collating and linking of underlying incident records by on-call engineers with incident management and service observability systems. For example, a user of network diagnostic application(s) 112 executing on various computing devices 110 can indicate the linking of the incident records and/or service events via an interface option on the network diagnostic application 112. In other examples, other applications can be used to indicate the configured associations between service events, service event types, services, incident reports, incident report types, etc. The configuration layer 152 may include an indication of a relationship (or link) between at least a subject service and the one or more other services, such that the query processing component 134 can identify the link and report the other services or service events of the other services (e.g., occurring at a similar time or otherwise indicated as depending on the subject service event) as possibly of interest.

In method 300, at action 304, an observation layer of the multiple-layer relational graph can be generated based on relationships between services based on monitoring network traffic or observing user behavior. In an example, layer generating component 140, e.g., in conjunction with processor 124, memory 126, operating system 128, graphing component 132, etc., can generate the observation layer of the multiple-layer relational graph based on relationships between services based on monitoring network traffic or other topological relationships or observing user behavior.

For example, observing component 144 can monitor the network traffic (e.g., coming from network diagnostic application(s) 112 or network diagnostic component 130) to determine correlated requests for services or service events. For example, where observing component 144 observes similar patterns in requests for services and/or service events at different times based on the network traffic, whether from the same network diagnostic application(s) 112 or different network diagnostic application(s), or other topological relationships between signal sources (e.g., the source being the service from which the service event is logged), observing component 144 may infer an observed relationship between the services and/or service events.

Similarly, where observing component 144 observes similar patterns in requests for services and/or service events at different times based on user behavior on the network diagnostic application 112 (e.g., as observed from the network diagnostic application 112 itself or requests received at the network diagnostic component 130), observing component 144 may infer an observed relationship between the services and/or service events. In one example, observing component 144 can observe user behavior of the diagnostic application 112 itself, which in one specific example may include a configuration of a user-defined interface of the network diagnostic application 112. For example, a user may define a user interface to analyze health or other metrics of network resources, where the interface may display signals generated based on observed service events (e.g., service events reporting resource utilization). In one specific example, based on physical proximity of signals on the interface (e.g., as being next to one another, part of the same chart/graph, etc.), observing component 144 can determine a relationship between the corresponding services. The information regarding the user-defined interface layout may be provided to the network diagnostic component 130, from which the observation layer 154 can receive such information.

An example is shown in FIG. 4, which illustrates an example of a user interface 400 of a network diagnostic application 112. In user interface 400, a user thereof may have defined the user interface 400 to include signals 402, 404, 406, 408 in the view. The signals 402, 404, 406, 408 may each correspond to a set of service events for different services that the user desires to monitor. The signals 402, 404, 406, 408 may show information of the service events (e.g., reliability, incoming request rate or reliability, etc.) over the same or similar period of time and/or at the same or similar time instances. In this example, observing component 144 can determine that the user interface 400 includes the signals 402, 404, 406, 408 on the same view and/or within a threshold physical proximity within the view, that the user interface 400 processes interactions on the signals 402, 404, 406, 408 at similar points in time, etc., and can accordingly observe a relationship between the corresponding service events and/or underlying services, which can be set in the observation layer 154 for subsequently determining related services or service events. As described, for example, observing component 144 can observe such properties of the user interface 400 based on at least one of determining the user interface 400 defined on the network diagnostic component 130 that facilitates operation of the network diagnostic application 112, receiving, at the network diagnostic component 130, an alert of creation/modification of the user interface 400 on the network diagnostic application 112, and/or the like.

In any case, the observation layer 154 may include an indication of a relationship (or link) between at least a subject service and the one or more other services, such that the query processing component 134 can identify the link and report the other services or service events of the other services (e.g., occurring at a similar time or otherwise indicated as depending on the subject service event) as possibly of interest.

In one example, observing component 144 may include an observation count, frequency, etc. based on a number of observations of the services and/or service events within a period of time, where the observation count may indicate a likelihood of correlation between the services and/or service events. Thus, for a given service or service event, query processing component 134 can determine related services or service events based on the observations, observation count, etc., to provide in response to a query for the given service. For example, these observations can indicate what services and/or service events on-call engineers are looking at when looking at the given service or service event, as described.

In method 300, at action 306, a learned layer of the multiple-layer relational graph can be generated based on relationships between services based on performing anomaly detection on key services. In an example, layer generating component 140, e.g., in conjunction with processor 124, memory 126, operating system 128, graphing component 132, etc., can generate the learned layer of the multiple-layer relational graph based on relationships between services based on performing anomaly detection on key services (e.g., a subject service where generating the learned layer 156 is performed in real-time or near real-time or otherwise). For example, learning component 146 can perform correlations, anomaly detection, or other machine-learning algorithms (e.g., pattern mining) on the services and/or service events in the service event repository 106 to identify likely related services and/or service events.

The learned layer 156 may include an indication of a relationship (or link) between at least a subject service and the one or more other services, such that the query processing component 134 can identify the link and report the other services or service events of the other services (e.g., occurring at a similar time or otherwise indicated as depending on the subject service event) as possibly of interest. For example, the learned layer 156 can detect anomalies in certain service event data over a period of time, such as resource utilization of services or related network nodes based on reported service events. For example, anomalies can be detected in similar changes in utilization amounts, the times at which utilization changes (e.g., regardless of whether the amount is similar), etc.

In one example, learning component 146 may determine a confidence score or other metric for identified anomalies between services and/or service events, which can be included in the learned layer 156. Thus, for a given service or service event, query processing component 134 can determine related services or service events based on the detected anomalies, the confidence score or other metric, etc., to provide in response to a query for the given service. In one example, the confidence score may be based on a number of correlations observed between the potentially related services or service events.

An example is shown in FIG. 5, which illustrates an example of a graphical depiction of signals 500 related to service events, where signal 502 relates to a set of service events of a service, such as resource utilization, etc., as described, and signal 504 relates to a different set of service events that may be determined as related to the set of service events of signal 502 based on correlation or other machine-learning algorithms. For example, correlation may show events happening at similar time instances, indicated by symbols 506. In an example, learning component 146 may determine a relationship between the underlying service events based on detecting a threshold number of events happening in each signal within a period of time (and/or a confidence score may be computed based on the frequency of correlated events among the signals or underlying service events). In an example, learning component 146 can set a determined relationship and/or related metrics in the learned layer 156 for subsequently determining related services or service events.

In the multiple-layer relational graph 150, relational data from the various layers 152, 154, 156 can be combined, as described, and used to build a knowledge graph between the services and their metrics. Traversal of this graph 150 can be useful in various applications, such as root cause analysis, determining most failing metrics, grouping of related metric failures etc.

Figure 6:
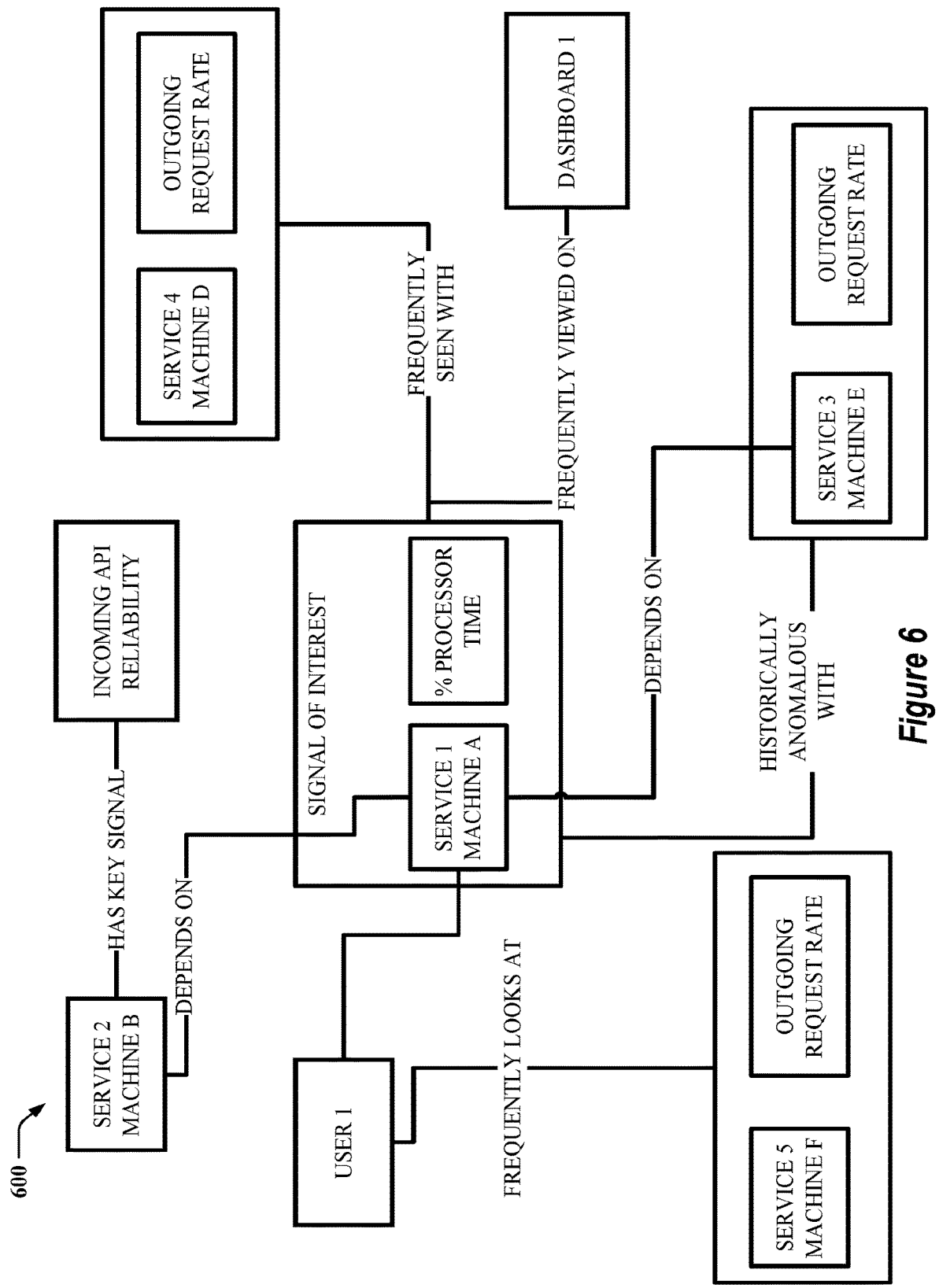
FIG. 6 is an example of a relational graph representation of a service and related service events in accordance with examples described herein.

FIG. 6 illustrates an example of a relational graph representation 600 of a set of service events. For example, representation 600 can indicate a signal of interest, which can refer to a metric (e.g., processor usage) measured on a specific network resource based on a collection of service events (e.g., events that indicate resource usage at periods of time). For example, the signal of interest can be requested and/or defined by a network diagnostic application 112 on a computing device 110 to receive, from the service event repository 106 in real-time, near real-time or otherwise, processor usage service events for the network resource via network diagnostic component 130. In an example, a query context can include an indication of the user, the service or associated network resource, and a view of the network diagnostic application 112 being requested (which can indicate the desired service events). In determining relationships with other service events, query processing component 134 can query the configuration layer 152 to determine that service 1 on machine A depends on service 2 on machine B, and/or specifically that the processor usage on service 1 on machine A depends on incoming API reliability on service 2 on machine B. Thus, query processing component 134 can provide, in response to a query for processor usage of service 1 on machine A, corresponding API reliability service events for service 2 on machine B.

Similarly, query processing component 134 can query the observation layer 154 to determine service events typically viewed by this user (or other users) along with the service event that is subject of the view to determine additional service events of interest (and/or related views of the additional service events, such as other signals). For example, query processing component 134 can determine a relationship (e.g., frequency looked at) indicated on observation layer 154 between the user looking at service 5 on machine F when also looking at service 1 on machine A. As described, this observation may be determined based on a user-defined interface that includes views of metrics for service 5 on machine F and service 1 on machine A (and specifically for outgoing request rate for service 5 on machine F with the processor usage time for service 1 on machine A). Thus, query processing component 134 can provide, in response to a query for processor usage of service 1 on machine A, corresponding outgoing request rate events for service 5 on machine F.

In another example, query processing component 134 can determine a relationship (e.g., frequency seen with) indicated on observation layer 154 between network traffic for obtaining metrics related to service 4 at machine D around the same time or times as network traffic for obtaining metrics related to service 1 on machine A (and specifically for outgoing request rate for service 4 on machine D with the processor usage time for service 1 on machine A). Thus, query processing component 134 can provide, in response to a query for processor usage of service 1 on machine A, corresponding outgoing request rate events for service 4 on machine D.

Similarly, query processing component 134 can query the learned layer 156 to determine service events that are historically anomalous with the service event that is subject of the view to determine additional service events of interest (and/or related views of the additional service events, such as other signals). For example, query processing component 134 can determine a relationship indicated on learned layer 156 between service 3 on machine E (and specifically outgoing request rate) and at service 1 on machine A. Thus, query processing component 134 can provide, in response to a query for processor usage of service 1 on machine A, corresponding outgoing request rate events for service 3 on machine E.

In any case, for example, the network diagnostic application 112 can indicate potential relationship between the various service events based on the correlations that are detected/observed at each or one or more (or all) layers in the multiple-layer relational graph.

Figure 7:
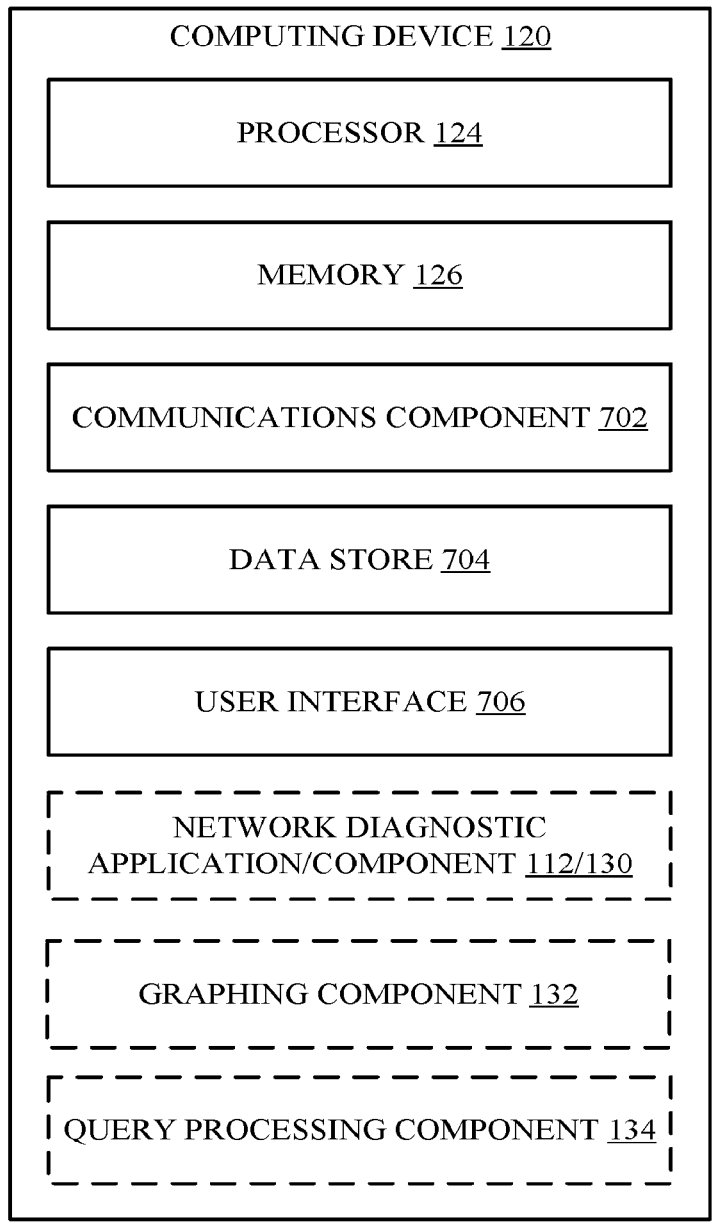
FIG. 7 is a schematic diagram of an example of a computing device for performing functions described herein.

FIG. 7 illustrates an example of computing device 120 including additional optional component details as those shown in FIG. 1. In one example, computing device 120 may include processor 124 for carrying out processing functions associated with one or more of components and functions described herein. Processor 124 can include a single or multiple set of processors or multi-core processors. Moreover, processor 124 can be implemented as an integrated processing system and/or a distributed processing system.

Computing device 120 may further include memory 126, such as for storing local versions of applications being executed by processor 124, related instructions, parameters, etc. Memory 126 can include a type of memory usable by a computer, such as random access memory (RAM), read only memory (ROM), tapes, magnetic discs, optical discs, volatile memory, non-volatile memory, and any combination thereof. Additionally, processor 124 and memory 126 may include and execute an operating system executing on processor 124, one or more applications, such as a network diagnostic application/component 112/130, graphing component 132, query processing component 134, and/or components thereof, as described herein, and/or other components of the computing device 120.

Further, computing device 120 may include a communications component 702 that provides for establishing and maintaining communications with one or more other devices, parties, entities, etc. utilizing hardware, software, and services as described herein. Communications component 702 may carry communications between components on computing device 120, as well as between computing device 120 and external devices, such as devices located across a communications network and/or devices serially or locally connected to computing device 120. For example, communications component 702 may include one or more buses, and may further include transmit chain components and receive chain components associated with a wireless or wired transmitter and receiver, respectively, operable for interfacing with external devices. For example, communications component 702 can carry communications between a network diagnostic application/component 112/130, graphing component 132, query processing component 134, etc. executing on another device (or the same device), etc., as described in various examples herein.

Additionally, computing device 120 may include a data store 704, which can be any suitable combination of hardware and/or software, that provides for mass storage of information, databases, and programs employed in connection with examples described herein. For example, data store 704 may be or may include a data repository for applications and/or related parameters not currently being executed by processor 124, may include the service event repository 106, etc. In addition, data store 704 may be a data repository for an operating system, application, such as a network diagnostic application/component 112/130, graphing component 132, query processing component 134, and/or components thereof, etc. executing on the processor 124, and/or one or more other components of the computing device 120.

Computing device 120 may also include a user interface component 706 operable to receive inputs from a user of computing device 120 and further operable to generate outputs for presentation to the user (e.g., via a display interface to a display device). User interface component 706 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, any other mechanism capable of receiving an input from a user, or any combination thereof. Further, user interface component 706 may include one or more output devices, including but not limited to a display interface, a speaker, a haptic feedback mechanism, a printer, any other mechanism capable of presenting an output to a user, or any combination thereof.

Computing device 120 can also include a network diagnostic application/component 112/130 for generating a query context related to one or more service events, a graphing component 132 for generating a multiple-layer relational graph defining relationships between service events, and/or a query processing component 134 for processing queries for service events by providing one or more other service events based on relationships defined in the multiple-layer relational graph, as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more examples, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various examples described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A system comprising:
    a processor; and
    a memory communicatively coupled to the processor and storing computer-executable instructions that, when executed, perform operations comprising:
        determining a first service event occurring in a network based on a query context associated with the network;
        determining a second service event having a defined relationship with the first service event at a layer of a relational graph having multiple layers by querying the layer, the defined relationship being based on the second service event occurring within a threshold time period of the first service event, wherein the multiple layers include:
            a configuration layer defining configured relationships between service events or between services and the service events; and
            an observation layer defining observed relationships between the service events or between the services and the service events;
        determining a metric for the query context based on a layer-specific weight defined for the layer; and
        based on the metric, providing an indication of the second service event.

2. The system of claim 1, wherein the query context indicates at least one of:
    a user or a user account;
    a network resource or a service of the services; or
    a view of the service events for the network resource.

3. The system of claim 2, wherein the view of the service events indicates a signal showing resource usage for the network resource over a period of time.

4. The system of claim 1, the operations further comprising:
    receiving the query context from a network diagnostic component that receives a query corresponding to the query context, the query being used to identify service event information.

5. The system of claim 4, wherein the network diagnostic component implements security policies that define security contexts for accessing the services or the service events.

6. The system of claim 1, wherein the configured relationships of the configuration layer are explicitly defined by a user who indicates known relationships between the service events or between the services and the service events.

7. The system of claim 1, wherein the observed relationships of the observation layer are based on observing network traffic of requests for the service events.

8. The system of claim 7, wherein the observed relationships are associated with observation counts indicating a number of occurrences of the observed relationships.

9. The system of claim 1, wherein determining the metric for the query context comprises:
    determining a first layer-specific weight for the configuration layer;
    determining a second layer-specific weight for the observation layer; and
    determining the metric based on the first layer-specific weight and the second layer-specific weight.

10. The system of claim 1, wherein a first layer-specific weight for the configuration layer is assigned a higher metric than a second layer-specific weight for the observation layer.

11. The system of claim 1, wherein the layer-specific weight is based on user feedback of whether correlations between the service events or between the services and the service events are accurate.

12. The system of claim 1, the operations further comprising:
    comparing the metric to a threshold value; and
    in response to determining the metric meets or exceeds the threshold value, providing the indication of the second service event.

13. The system of claim 1, wherein the indication of the second service event includes a graphical representation of:
    a first series of data corresponding to the first service event; and
    a second series of data corresponding to the second service event.

14. A method comprising:
    determining a first service event occurring in a network based on a query context associated with the network;
    determining a second service event having a defined relationship with the first service event at a first layer of a relational graph having multiple layers by querying the first layer, each layer of the multiple layers has a corresponding layer-specific weight, wherein the multiple layers include:
        a configuration layer defining configured relationships between service events or between services and the service events; and
        a learned layer defining algorithmically-determined relationships between the service events or between the services and the service events;
    determining a metric for the query context based on a first layer-specific weight defined for the first layer; and
    based on the metric, providing an indication of the second service event.

15. The method of claim 14, wherein the algorithmically-determined relationships of the learned layer are based on detected data anomalies for the service events.

16. The method of claim 14, the method further comprising:
    querying a second layer of the relational graph; and
    determining the metric for the query context based, in part, on a second layer-specific weight defined for the second layer.

17. A device comprising:
    a processor; and a memory communicatively coupled to the processor and storing computer-executable instructions that, when executed, perform operations comprising:
determining a first service event occurring in a network based on a query context associated with the network;
determine a second service event having a defined relationship with the first service event at a layer of a relational graph having multiple layers by querying the layer, wherein the multiple layers include:
an observation layer defining observed relationships between service events or between services and the service events; and
a learned layer defining algorithmically-determined relationships between the service events or between the services and the service events;
determining a metric for the query context based on a layer-specific weight defined for the layer; and
based on the metric, providing an indication of the second service event, wherein the indication of the second service event comprises at least one of:
the metric; or
the defined relationship between the first service event and the second service event.

18. The device of claim 17, wherein the query context indicates at least one of:
a user or a user account;
a network resource or a service of the services; or
a view of the service events for the network resource.

19. The device of claim 18, wherein the view of the service events indicates a signal showing resource usage for the network resource over a period of time.

20. The device of claim 17, the operations further comprising:
receiving the query context from a network diagnostic component that receives a query corresponding to the query context, the query being used to identify service event information.

* * * * *